(12) United States Patent
Sabongi et al.

(10) Patent No.: US 7,177,824 B2
(45) Date of Patent: Feb. 13, 2007

(54) EFFICIENCY METRIC SYSTEM FOR A QUICK-SERVICE RESTAURANT

(75) Inventors: Gebran J. Sabongi, Woodbury, MN (US); Ronald W. Hall, South St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 138 days.

(21) Appl. No.: 10/128,661

(22) Filed: Apr. 23, 2002

(65) Prior Publication Data

US 2003/0200147 A1    Oct. 23, 2003

(51) Int. Cl.
    *G06Q 30/00*    (2006.01)
(52) U.S. Cl. .................... 705/15; 705/11; 702/182
(58) Field of Classification Search .......... 705/7, 705/8, 9, 10, 11, 13, 15, 16, 17, 18, 21; 702/182
    See application file for complete search history.

(56) References Cited

U.S. PATENT DOCUMENTS

| | | | |
|---|---|---|---|
| 1,796,668 A | | 1/1931 | Sarfaty |
| 3,310,797 A | | 3/1967 | Auger |
| 3,821,707 A | | 6/1974 | Peters |
| 4,222,111 A | | 9/1980 | Sloan et al. |
| 4,254,404 A | | 3/1981 | White |
| 4,553,222 A | * | 11/1985 | Kurland et al. ........... 705/15 |
| 4,675,515 A | * | 6/1987 | Lucero ................... 235/381 |
| 4,701,849 A | * | 10/1987 | Elden ..................... 705/11 |
| 4,777,488 A | | 10/1988 | Carlman, Jr. et al. |
| 4,800,438 A | | 1/1989 | Yuter |
| 5,003,472 A | | 3/1991 | Perrill et al. |
| 5,032,834 A | | 7/1991 | Kane et al. |
| 5,128,862 A | | 7/1992 | Mueller |
| 5,262,938 A | | 11/1993 | Rapoport et al. |
| 5,272,474 A | | 12/1993 | Hilliard |
| 5,321,848 A | | 6/1994 | Miyahira et al. |
| 5,510,979 A | | 4/1996 | Moderi et al. |
| 5,644,630 A | | 7/1997 | Durco, Jr. |
| 5,699,039 A | | 12/1997 | Korzen |
| 5,784,685 A | | 7/1998 | Stanford et al. |
| 5,794,127 A | | 8/1998 | Lansang |

(Continued)

FOREIGN PATENT DOCUMENTS

JP    5089370 A    4/1993

(Continued)

OTHER PUBLICATIONS

White, Ron, How Computers Work, Millennium Ed. Que Corporation, Sep. 1999.*

(Continued)

*Primary Examiner*—Andrew J. Fischer
(74) *Attorney, Agent, or Firm*—Stephen W. Buckingham

(57) ABSTRACT

A system for automatically gathering efficiency metrics in a quick-service establishment that makes use of certain data signals already generated in a great number of such establishments. A repeating communication device, which is used to receive and re-broadcast communications amongst the employees of the quick service restaurant, acts as a central hub that receives various data signals. The data signals may be analyzed, and the information hidden therein may be unearthed. The information may be transmitted to a remote computer system for further analysis, which may receive similar data from similar quick-service establishments.

14 Claims, 10 Drawing Sheets

U.S. PATENT DOCUMENTS

| | | | |
|---|---|---|---|
| 5,798,931 | A | 8/1998 | Kaehler |
| 5,828,294 | A | 10/1998 | Shank |
| 5,838,798 | A | 11/1998 | Stevens, III |
| 5,839,115 | A | 11/1998 | Coleman |
| 5,845,263 | A | 12/1998 | Camaisa et al. |
| 5,912,743 | A | 6/1999 | Kinebuchi et al. |
| 5,926,111 | A | 7/1999 | Davis et al. |
| 5,963,137 | A | 10/1999 | Waters, Sr. |
| 5,969,968 | A | 10/1999 | Pentel |
| 5,999,088 | A | 12/1999 | Sibbitt |
| 6,050,214 | A | 4/2000 | O'Keefe |
| 6,081,695 | A | 6/2000 | Wallace et al. |
| 6,087,927 | A | 7/2000 | Battistini |
| 6,101,479 | A * | 8/2000 | Shaw ............ 705/8 |
| 6,157,908 | A | 12/2000 | O'Gwynn |
| 6,208,976 | B1 | 3/2001 | Kinebuchi et al. |
| 6,366,196 | B1 | 4/2002 | Green et al. |
| 6,490,519 | B1 | 12/2002 | Lapidot et al. |
| 6,529,131 | B2 | 3/2003 | Wentworth |
| 6,574,603 | B1 | 6/2003 | Dickson |
| 6,580,360 | B1 | 6/2003 | McKee et al. |
| 2002/0026364 | A1 | 2/2002 | Mayer et al. |
| 2002/0052790 | A1 | 5/2002 | Tomishima |
| 2002/0115435 | A1 | 8/2002 | Soh |
| 2003/0069768 | A1* | 4/2003 | Hoffman et al. ........ 705/7 |
| 2003/0069791 | A1* | 4/2003 | Menninger ............ 705/15 |
| 2003/0074239 | A1* | 4/2003 | Hoffman et al. ........ 705/7 |
| 2003/0135477 | A1* | 7/2003 | Elsey et al. ............ 707/1 |
| 2003/0158763 | A1* | 8/2003 | McKee ............ 705/7 |

FOREIGN PATENT DOCUMENTS

| | | | |
|---|---|---|---|
| JP | 8022492 | A | 1/1996 |
| JP | 9269963 | A | 10/1997 |
| JP | 2000 040105 | A | 2/2000 |
| JP | 2000 194759 | A | 7/2000 |
| JP | 2000 194781 | A | 7/2000 |
| JP | 2000 194943 | A | 7/2000 |
| JP | 2002 042237 | A | 2/2002 |
| JP | 2002 083025 | A | 3/2002 |
| JP | 2002 117120 | A | 4/2002 |
| JP | 2002 123870 | A | 4/2002 |
| JP | 2002 140767 | A | 5/2002 |
| KR | 2001 063628 | A | 7/2001 |
| WO | WO 8304327 | A | 12/1983 |
| WO | WO 9118482 | | 11/1991 |

OTHER PUBLICATIONS

Derfler, Frank J. et. al. How Networks Work, Millennium Ed., Que Corporation, Jan. 2000.*

Gralla, Preston, How the Internet Works, Millennium Ed., Que Corporation, Aug. 1999.*

Press Release: System 30 Timer with Dual Color Display Motivates Drive-Thru Employees, HME Electronics, Inc., Apr. 17, 2000.*

Press Release: PC30 Software Facilitates Management of Drive-Thru Service, HME Electronics, Inc., Jun. 21, 2001.*

Press Release: System 900 Speasak to Drive-Thu Managers, HME Electronics, Inc., Mar. 19, 2001.*

QSR Online Web Page Printouts , Jan. 27, 2002 and Charts.*

Farahmand, Kambiz, et. al. "Simulation and Animation of the Operation of a Fast Food Restaurant" Proceedings of the 1996 Winter Simulation Conference, pp. 1264-1271, Charnes, J.M. et. al. eds.*

Table Manager™ brochure, 2001, 12 pgs. published by Sun Telecom International, Inc. Louisville, KY.

ProHost32™ brochure, 1997, 4 pgs. published by Rock Systems, Jacksonville, FL.

http://web.archive.org/web/20010524192507/http://www.hme.com/ (published on or before May 24, 2001), 4 pgs—date printed Sep. 30, 2004.

HM Electronics, Inc. System 30 Timer product brochure, 3 pgs. http://www.hme.com/products/quickservice/$_{13}$ system30.html (published on or before May 24, 2002), 1 pg.—date printed Oct. 25, 2002.

HM Electronics, Inc. WT25 Window Timer product brochure, 2 pgs. http://www.hme.com/products/quickservice/standardwt25.html (published on or before May 24, 2002), 1 pg.—date printed Oct. 25, 2002.

RD 442048, Feb. 10, 2001, Abstract.

Phase Research, Fast Track 2+2/386® 2000 Series Timer Sixteen (16) Main Console Reports, 11 pages, printed Mar. 9, 2005 from http://www.phasereseach.com/reports_2000mc.html.

Phase Research, Fast Track 2+2/386® 2000 Series Drive-Thru Timer System User Guide, © 1999.

* cited by examiner

EFFICIENCY METRIC SYSTEM FOR A QUICK-SERVICE RESTAURANT

FIELD OF THE INVENTION

This invention relates generally to a communication network deployed in a quick-service restaurant, and more particularly to a communication network adapted to gather data regarding efficiency metrics of the quick-service restaurant.

BACKGROUND OF THE INVENTION

Quick-service restaurants are dependent upon drive-through customers for profitability. A typical quick-service restaurant may sell 50% of its food products to drive-through customers. A good deal of drive-through sales occurs during peak hours, such as during a lunch hour or around dinner time. During these peak hours, it is important that a quick-service restaurant efficiently service its drive-through customers, so that it might sell to more drive-through customers.

Oftentimes, it is difficult for the management of a particular quick-service restaurant to come to an understanding of its efficiency with respect to servicing drive-through customers. Management often lacks precise measurements that allow drive-through service efficiency to be understood from different angles. Such information would permit management to understand what aspect of the restaurant operation needs addressing.

One difficulty in attempting to generate such data has been in collecting the data. A quick-service restaurant is often unable to afford to hire extra personnel devoted to the task of gathering information regarding its operation. Another difficulty is that even if such efficiency data is gathered, it is difficult to put such data in context, so as to understand whether a particular measurement is good or bad for a quick-service restaurant. Thus, management may not be able to anticipate the level of improvement that is realizable with respect to a particular aspect of their operation.

As is evident from the foregoing, there is a need for an efficiency metric gathering system that is deployable in quick-service restaurants. A desirable system will utilize exisiting equipment, be relatively inexpensive, and be flexible with respect to the kinds of efficiency metrics that are measured. A desirable system will also provide a context for the generated efficiency data, so that management is able to judge such data intelligently.

SUMMARY OF THE INVENTION

Against this backdrop the present invention has been developed. (The summary will be drafted upon finalization of the claims.)

DETAILED DESCRIPTION OF THE INVENTION

Efficiency metrics may be automatically gathered by a system that makes use of certain data signals already generated in a great number of quick-service restaurants. For example, in most quick-service restaurants, a piece of equipment is prompted with a data signal to announce the arrival of a car at the drive-up menu. By adapting a repeater, which is used to receive and re-broadcast communications amongst the employees of the quick service restaurant, to act as a central hub that receives the various data signals, the data signals may be analyzed, and the information hidden therein may be unearthed. For example, by comparing the number of talk or page operations conducted over a period of time with the number of cars that have arrived at the drive-through window over the same period of time, it is possible to arrive at an estimate of talk or page operations per car, and therefore to determine the level of confusion in the operation.

The data gathered by the repeater may be communicated to a remote computer system for analysis. The remote computer system may gather data from other similar quick-service restaurants (e.g., other quick-service restaurants of the same franchise). The remote computer may then communicate an analysis of the information back to each restaurant from which it received data. Its analysis may include a comparison of one quick-service restaurant to other quick-service restaurants, so that the management of the particular restaurant is able to better understand the meaning of the data. For example, with respect to the number of talk operations per car, a management team may learn that its restaurant averages 7.2 talk operations per car, while the average for similar quick-service restaurants is only 2.1. Thus, management would know that a great deal of improvement can be made in that area.

Figure 1:
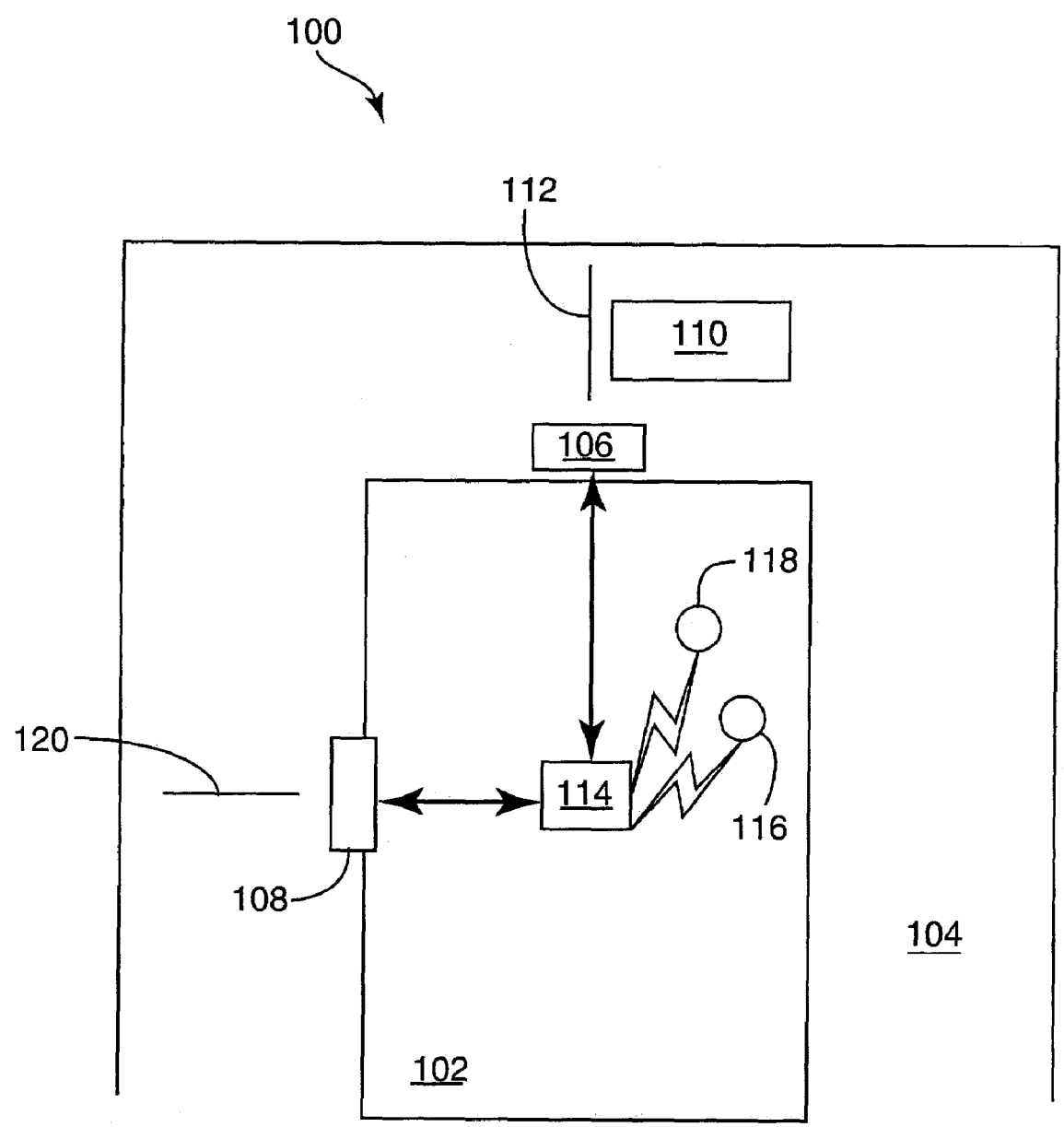
FIG. 1 depicts an efficiency metric gathering system, which is deployed in a quick-service restaurant.

FIG. 1 depicts an efficiency metric gathering system 100, which is deployed in a quick-service restaurant 102. As is typical, the quick-service restaurant 102 possesses a drive-through lane 104, along side of which are disposed a drive-through menu sign 106 and a pick-up window 108. A car 110 is depicted driving through the drive-through lane 104.

As the car 110 reaches the drive-through menu sign 106, its arrival is detected by a presence detector 112. The presence detector 112 may take the form of a magnetic switch that activates in response to the metalic frame/body of the car 110 or may be a pressure strip located underneath the pavement of the drive-through lane 104. These and other embodiments of presence detectors 112 are known in the art. In response to the presence detector 112 indicating the arrival of the car 110, a data signal is communicated to a repeater 114. The repeater 114 is a piece of equipment primarily responsible for receiving transmissions from one communication device 116 and re-broadcasting such transmissions to another communication device 116. Each communication device 116 is a two-way radio that can be used by employees to communicate with each other and with customers. The communication device 116 may be a headset that can be worn by an employee. In the alternative, the communication device 116 may be a countertop unit, wall-mounted intercom unit, or may have a number of other configurations. For simplicity, the two-way radio communication devices discussed herein will be referred to as headsets. Transmissions between headsets 116 and 1 18 are referred to as "pages." In response to the data signal, the repeater 114 generates a tone to a headset 116 worn by an employee who is responsible for taking the order of the drive-through customer in the car 110. The tone alerts the employee to the customer's presence at the drive-through menu sign 106.

In response to the tone, the employee performs a "talk" operation with his headset 116. A talk operation is a function supported by the repeater 114. Per a talk operation, the employee's voice is transmitted from the employee's headset 116 to the repeater 114, which, in turn, communicates the employee's voice to a speaker mounted in proximity to the drive-through menu sign 106. Thus, per the use of a talk operation, the employee greets the customer/car 110 and asks for the customer's order. The customer's 110 response is transduced by a microphone, also mounted in proximity to the menu sign 106, and is communicated to the repeater 114, for transmission to the employee 116.

After the customer's 110 order has been taken, the car 110 pulls forward and arrives at the pick-up window 108. The car's 110 departure from the menu sign 106 is observed by the presence indicator 106 (the magnetic switch/pressure strip ceases to be activated), and this information is communicated to the repeater 114. Meanwhile, the car's 110 arrival at the pick-up window 108 is observed by a second presence detector 120, which operates in a manner similar to the first presence detector 112.

At the pick-up window 108, the customer 110 pays for and receives his/her order. In one embodiment (not depicted) a separate window, preceding the pick-up window 108, is used for paying for the order. After receiving his/her food, the customer 110 pulls away from the pick-up window 108. Once again, the car's 110 departure from the pick-up window 108 is observed by the presence detector 120, by virtue of the presence indicator 106 ceasing to be activated. This information is communicated to the repeater 114.

Although the foregoing discussion (and the remainder of this disclosure) refers the repeater 114 as handling all operations/functions relating to both voice and data communication/processing, one skilled in the art understands that these functions/operations may be divided between many pieces of equipment, which together function as described herein. Such embodiments are contemplated and are within the scope of the claims appended hereto.

The system 100 of FIG. 1 may be adapted to collect various forms of efficiency data, as will be discussed in greater detail below. For example, the system 100 may be adapted to record the average number of talk operations per car over a certain period of time. As discussed above, such a measurement may be used as a proxy measurement of confusion within the operation (the premise being that talk operations relate to communication for the sake of clarifying some misunderstanding). Other types of efficiency data can also be gathered. Once the efficiency data is gathered, the data may be communicated to a remote computer 200, as depicted in FIG. 2.

Figure 2:
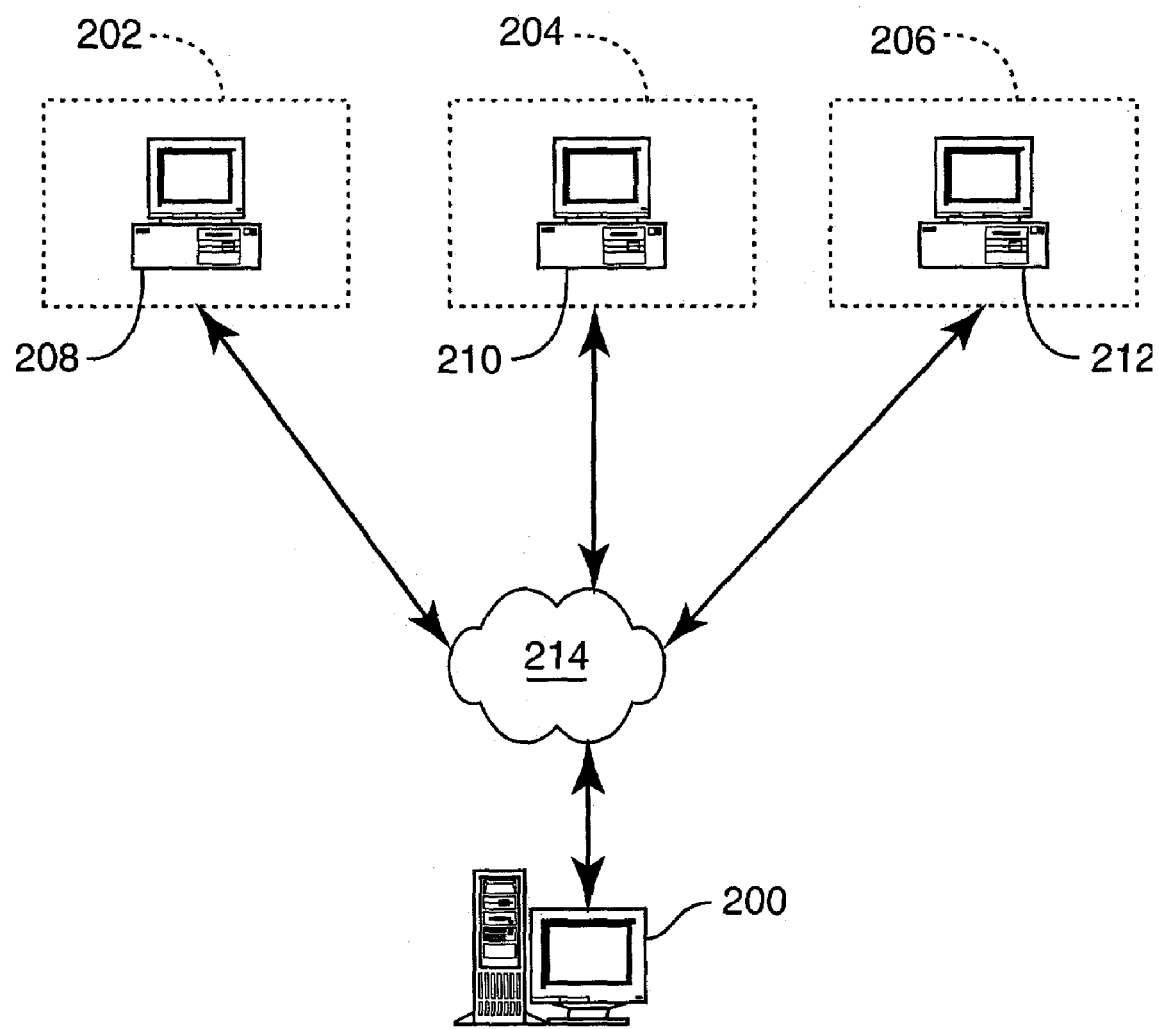
FIG. 2 depicts a efficiency metric analysis system, in accordance with one embodiment of the present invention.

As depicted in FIG. 2, each of a set of similar quick-service restaurants 202, 204, and 206 possesses a computer 208, 210, and 212 (which may be integrated into the repeater 114). These computers 208, 210, and 212 communicate via a network 214, such as the Internet, to the remote computer 200. In response, the remote computer 200 analyzes the data and returns its analysis to each restaurant 202, 204, and 206.

The analysis may include many components. For example, the analysis may include a calculation of such parameters as: (1) the average amount of time spent by a car at a drive-through menu sign for a particular restaurant; (2) the average amount of time between arrival of a car at a drive through menu sign and a greeting being delivered to the car; (3) the total number of cars served over a particular span of time; (4) the average amount of time between a car leaving a drive-through menu and arriving at a pick-up window; (5) the average amount of time spent by a car at a pick-up window; (6) the average amount of time during which a pick-up window is vacant while a car occupies some other portion of the drive-through lane; (7) the average number of times an employee speaks with a customer while the customer is at the drive-through menu sign; and (8) the average number of times the employees of the restaurant speak with each other while servicing a drive-through customer. Other efficiency metrics may be gathered and are within the scope of the invention.

The analysis may track the above-mentioned metrics over long periods of time. The remote computer 200 may indefinitely store efficiency metrics that have been transmitted to it from the various restaurants 202, 204, and 206. Thus, over time, it may be possible for a particular restaurant 202, 204, or 206 to view the progress of its metrics over the course of years. In so doing, a particular restaurant 202, 204, or 206 may unearth seasonal trends, or trends related to particular employees or particular menu offerings. Correlations between the efficiency metrics and these other variables may be included as part of the analysis. Additionally, the analysis may include information relating a particular restaurant 202, 204, or 206 to a set of similar restaurants. For example, with respect to the example of the number of talk operations per customer, a particular restaurant 202, 204, or 206 may be informed that it averages 7.2 talk operations per customer, but that the mean value for this metric is 2.1 for a population of 250 reporting restaurants 202, 204, and 206. The restaurant 202, 204, or 206 may also be returned a median value for the same metric. Further, the restaurant 202, 204, or 206 may be informed that it ranked #200 out of 250 reporting restaurants 202, 204, and 206, meaning that it scored in only the 20th percentile. Other forms of statistical comparison of a particular restaurant's 202, 204, or 206 metrics against that of a similar group may be performed and returned to the restaurant 202, 204, or 206, thereby helping the management of the restaurant 202, 204, or 206 put its metrics into a sensible perspective.

The central computer 200 may return its analysis via any form of data transfer, including e-mail, file transfer protocol (ftp), or in response to a hypertext transfer request (i.e., placing the analyzed data on the WorldWide Web).

The remainder of the specification is dedicated to tactics for gathering efficiency metrics based upon data signals typically available in quick-service restaurants. It is understood that the methods disclosed with respect to FIGS. 3–11 may be executed by a processor embedded in the repeater 114, or may be executed by a processor in a computer that is in data communication with the repeater 114. Further, some of the steps may be performed by the central computer 200, rather than by a processor located at the restaurant 202, 204, or 206. Those skilled in the art understand that processing steps may be divided amongst many computers. Such embodiments are contemplated and are within the scope of the claims appended hereto. Additionally, one skilled in the art will understand that many methods of obtaining the metrics disclosed herein are possible. Other methods of obtaining the metrics disclosed herein are contemplated and are within the scope of the claims appended hereto.

Figure 3:
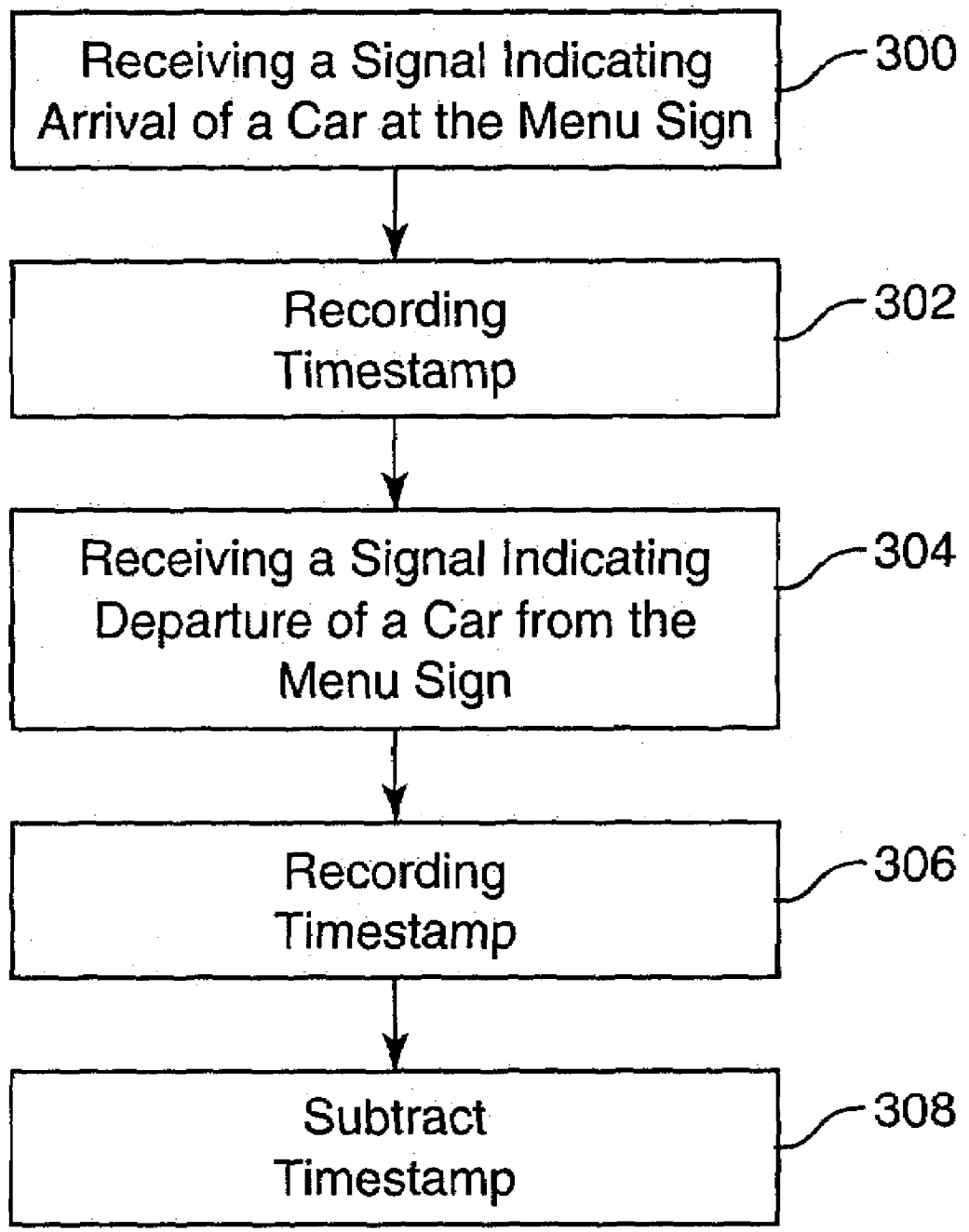
FIG. 3 depicts an embodiment of a method for measuring the length of time for which a given car waits at a drive-through menu sign.

FIG. 3 depicts an embodiment of a method for measuring the length of time for which a given car 110 waits at a drive-through menu sign 106. The method of FIG. 3 commences with the repeater 114 receiving a signal from the presence detector 112, indicating the arrival of a car 110 at the drive-up menu sign 106, as is depicted in operation 300. Next, the repeater 114 records the time at which the car 110 arrived at the drive-up menu sign 106, as is depicted in operation 302. When the car 110 pulls away from the drive-up menu sign 106, the presence detector 112 is deactivated, and a data signal is transmitted to the repeater 114, as is indicated by operation 304. In response, the repeater records the time at which the car 110 departed from the menu sign 106, as depicted by operation 306. Finally, in operation 308, the timestamps recorded in operations 306 and 302 are subtracted, thereby arriving at the amount of time spent by the car 110 at the drive-up menu sign 106.

Figure 4:
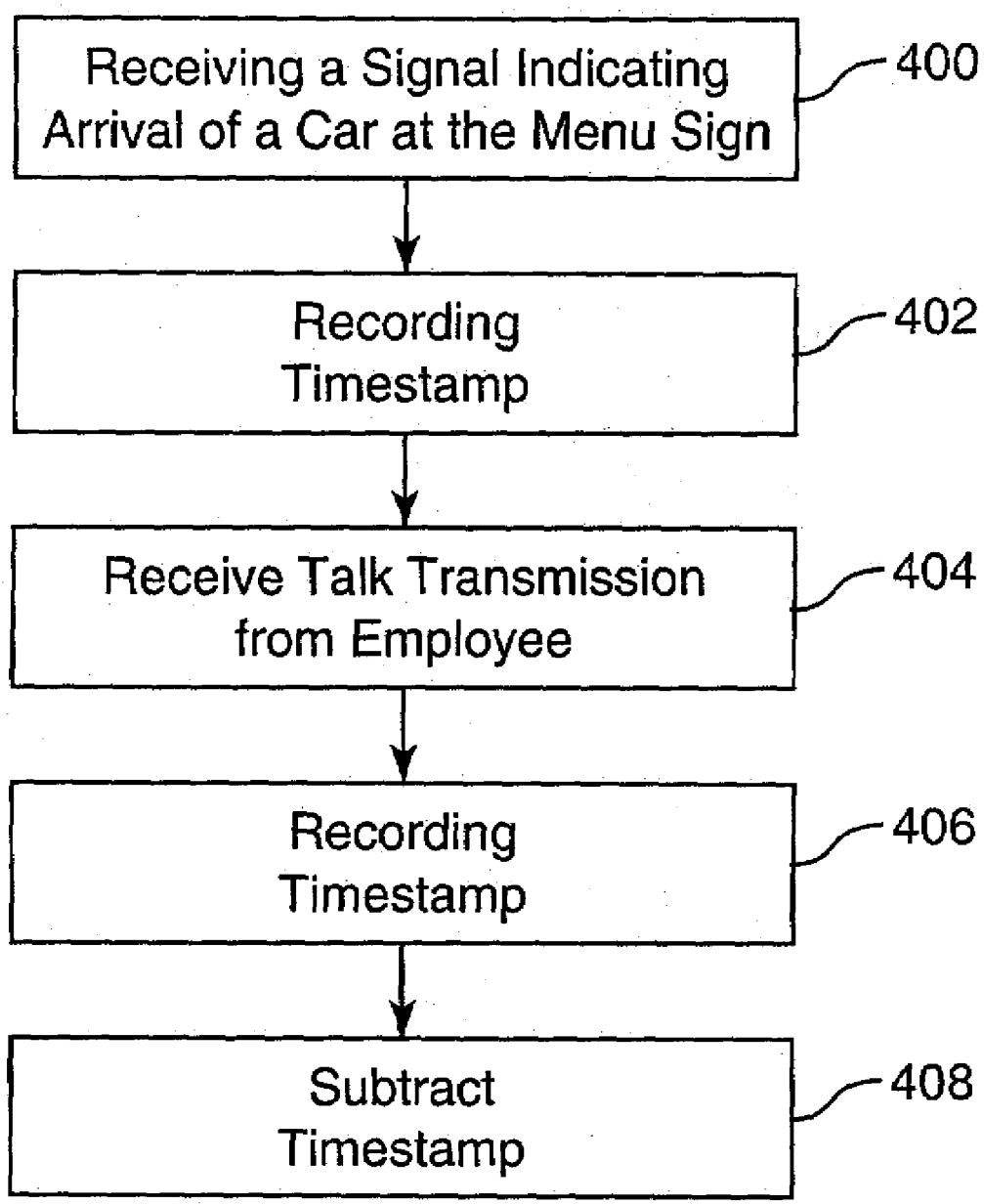
FIG. 4 depicts an embodiment of a method for measuring the length of time transpiring between the arrival of a car at a drive-through menu sign and the car/customer being greeted.

FIG. 4 depicts an embodiment of a method for measuring the length of time transpiring between the arrival of a car 110 at a drive-through menu sign 106 and the car/customer 110 being greeted. The method of FIG. 4 commences with the repeater 114 receiving a signal from the presence detector 112, indicating the arrival of a car 110 at the drive-up menu sign 106, as is depicted in operation 400. Next, the repeater 114 records the time at which the car 110 arrived at the drive-up menu sign 106, as is depicted in operation 402. When the employee 116 performs a talk operation to greet the car, the transmission is received by the repeater 114, as is depicted by operation 404. In response, the repeater 114 records the time of the transmission, as is depicted in operation 406. Finally, in operation 408, the timestamps of operations 406 and 402 are subtracted, thereby arriving at the length of time transpiring between the arrival of a car 110 at a drive-through menu sign 106 and the car/customer 110 being greeted.

Figure 5:
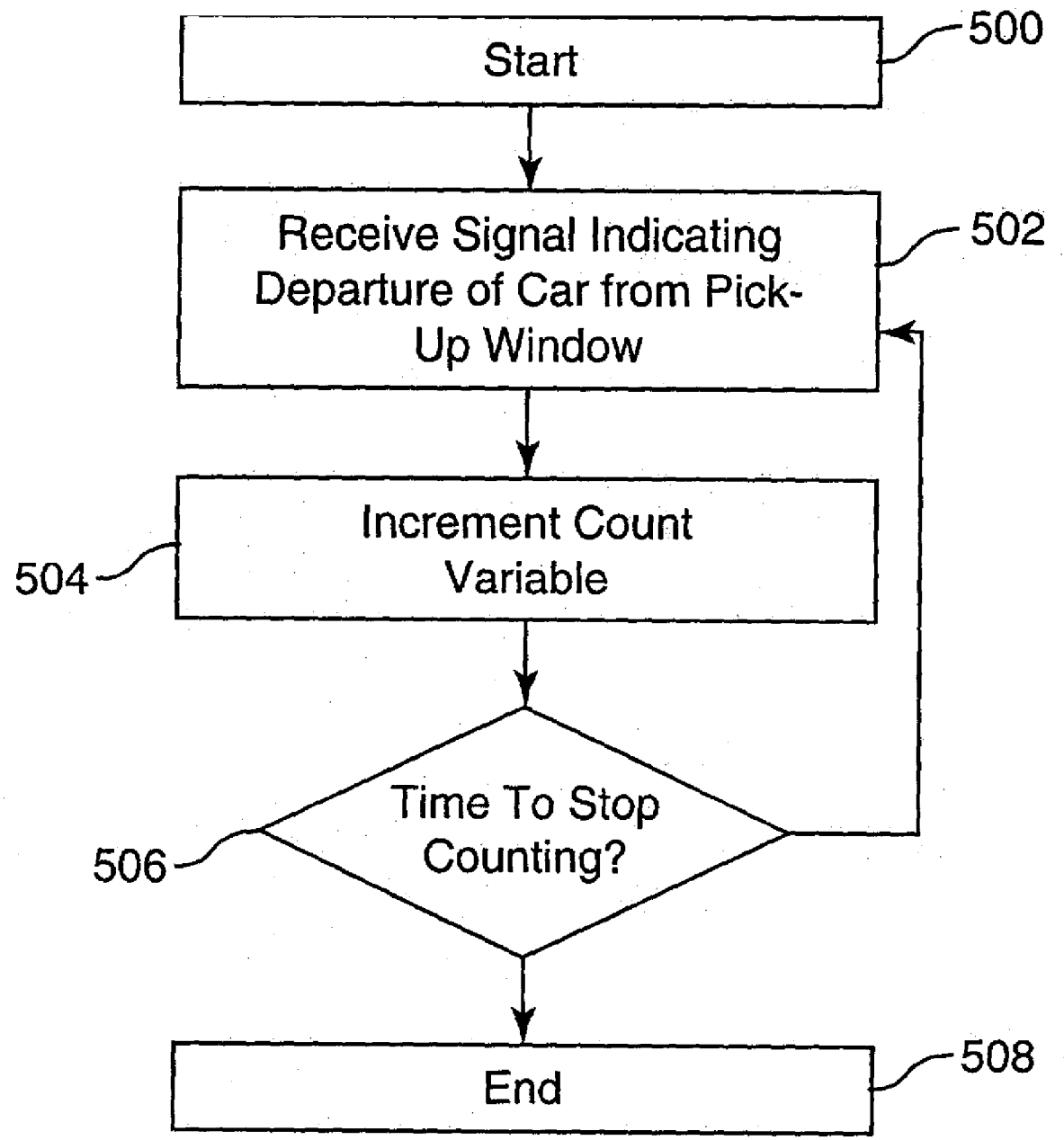
FIG. 5 depicts an embodiment of a method for measuring the total number of cars served over a span of time.

FIG. 5 depicts an embodiment of a method for measuring the total number of cars 110 served over a span of time. The method of FIG. 5 begins at a point in time at which the counting process is to commence, as is indicated by operation 500. Thereafter, the repeater 114 awaits a signal from the presence detector 120 indicating that a car 110 has departed from the pick-up window 108, as is depicted by operation 502. In response thereto, a count variable (which represents the total number of cars served) is incremented, as depicted by operation 504. In operation 506 it is determined whether or not the designated span of time during which counting is to take place has elapsed. If the span of time has elapsed, the process ends, as is shown by operation 508. If the span of time has not elapsed, the repeater 114 returns to its state of awaiting a signal from the presence detector 120, as depicted by operation 502.

Figure 6:
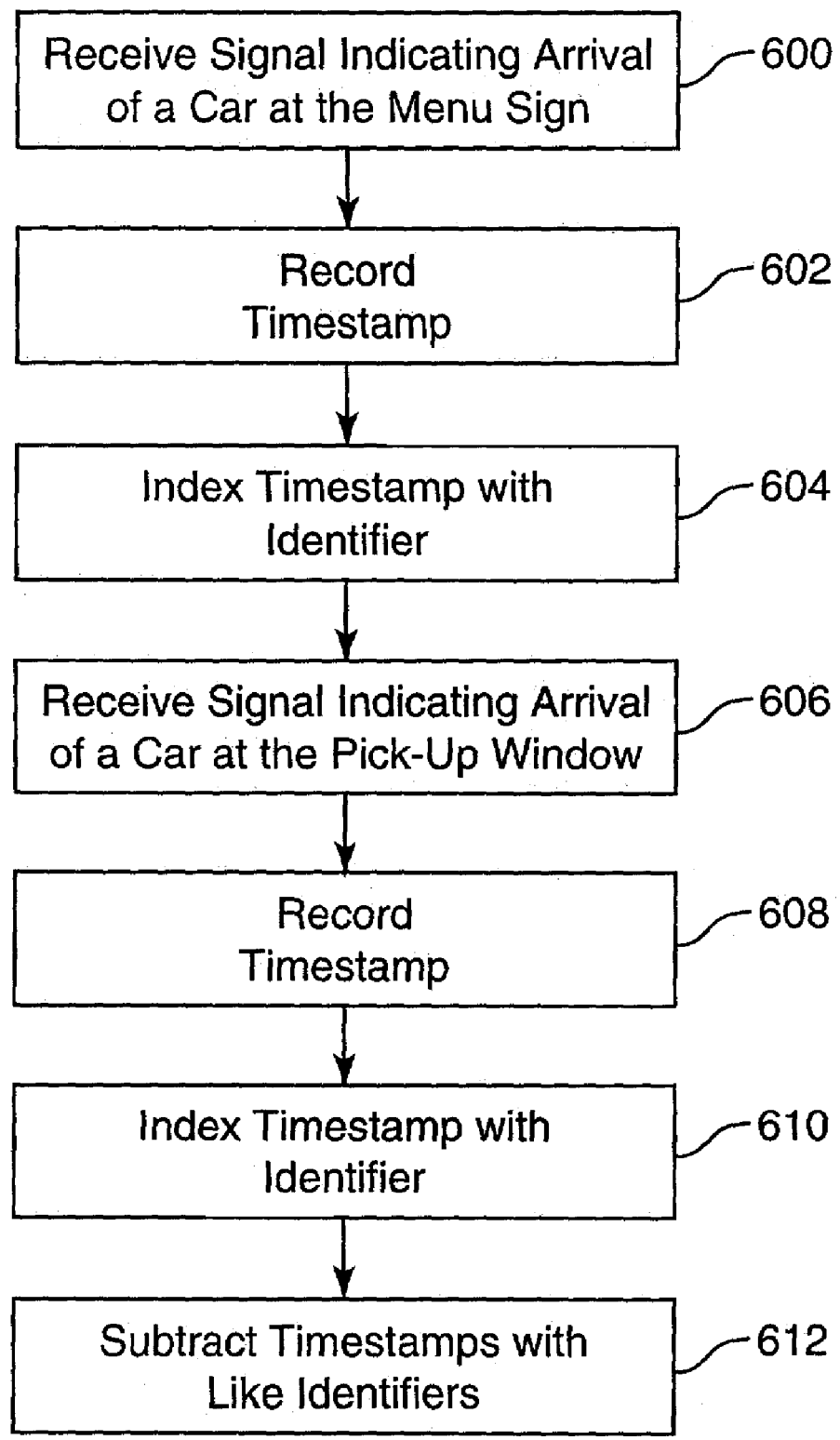
FIG. 6 depicts an embodiment of a method for measuring the length of time transpiring between a car leaving the drive-through menu sign and arriving at the pick-up window.

FIG. 6 depicts an embodiment of a method for measuring the length of time transpiring between a car 110 leaving the drive-through menu sign 106 and arriving at the pick-up window 108. The method of FIG. 6 begins with the repeater 114 receiving a signal from the presence detector 112, indicating the departure of a car 110 from the drive-up menu sign 106, as is depicted in operation 600. Next, the repeater 114 records the time at which the car 110 departed from the drive-up menu sign 106, as is depicted in operation 602. In operation 604, the timestamp recorded in operation 602 is associated with a car identifier, so that the timestamp can be associated with a particular car 110. For example, a simple counter can be incremented each time a car 110 arrives at the drive-through menu sign 106. The value of the counter can be used as a car identifier. The car identifier and the timestamp recorded in operation 602 are then associated by the repeater 114 (perhaps by storing them together in a data structure). When the car 110 arrives at the pick-up window 108, the signal from the presence indicator 120 is communicated to the repeater 114, and the repeater 114 receives the signal, as is indicated by operation 606. Next, the repeater 114 records the time at which the car 110 arrived at the pick-up window 108, as depicted in operation 608. As was done in operation 604, the timestamp of operation 608 is assocaited with a car identifier in operation 610. Finally, in operation 612, the timestamps of operations 608 and 602 with like car identifiers are subtracted, thereby yielding the length of time transpiring between a car 110 leaving the drive-through menu sign 106 and arriving at the pick-up window 108.

Figure 7:
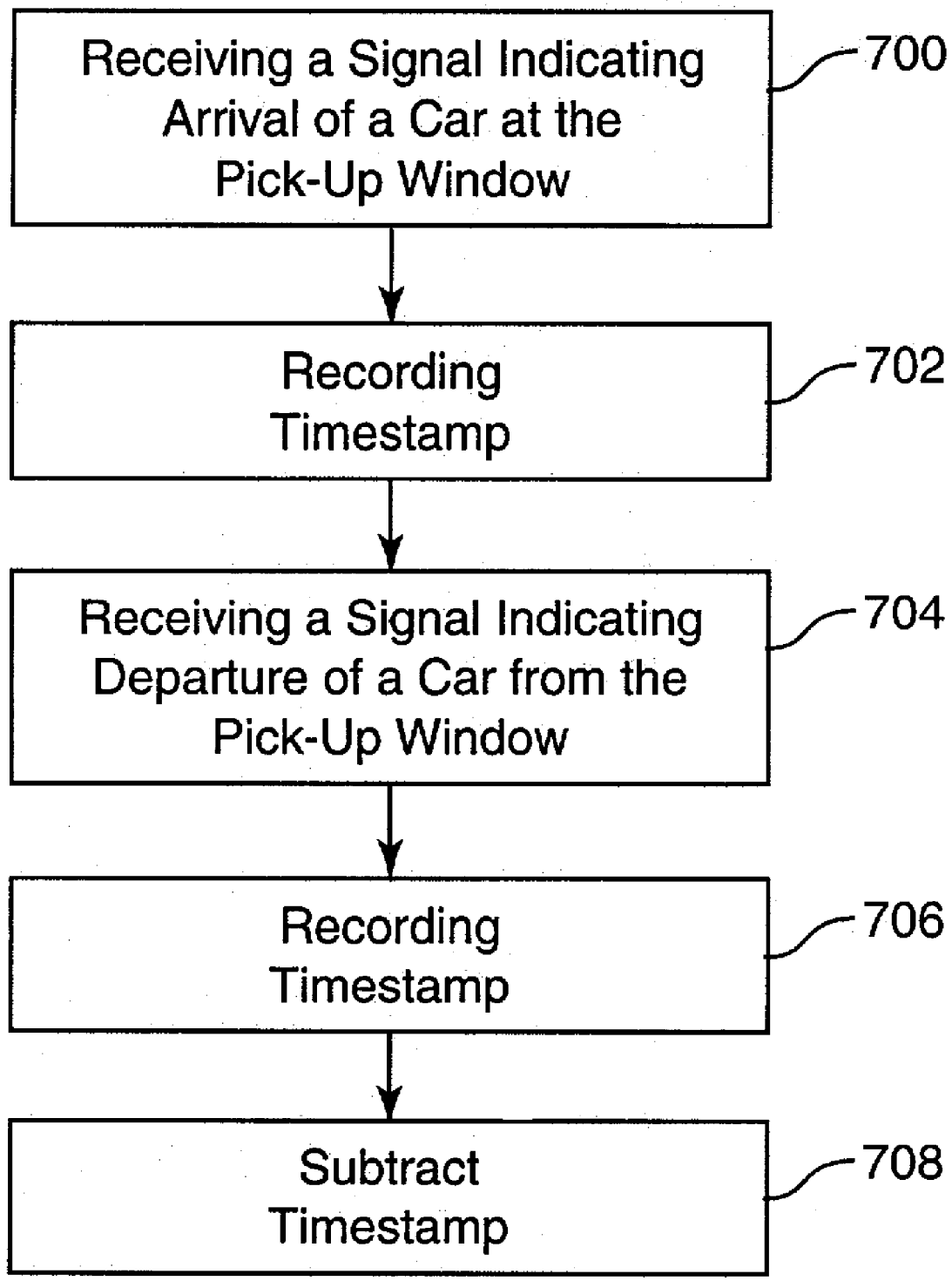
FIG. 7 depicts an embodiment of a method for measuring the length of time for which a given car waits at a pick-up window.

FIG. 7 depicts an embodiment of a method for measuring the length of time for which a given car 110 waits at a pick-up window 108. The method of FIG. 7 commences with the repeater 114 receiving a signal from the presence detector 120, indicating the arrival of a car 110 at the pick-up window 108, as is depicted in operation 700. Next, the repeater 114 records the time at which the car 110 arrived at the pick-up window 108, as is depicted in operation 702. When the car 110 pulls away from the pick-up window 108, the presence detector 120 is deactivated, and a data signal is transmitted to the repeater 114, as is indicated by operation 704. In response, the repeater 114 records the time at which the car 110 departed from the pick-up window 108, as depicted by operation 706. Finally, in operation 708, the timestamps recorded in operations 706 and 702 are subtracted, thereby arriving at the amount of time spent by the car 110 at the pick-up window 108.

Figure 8:
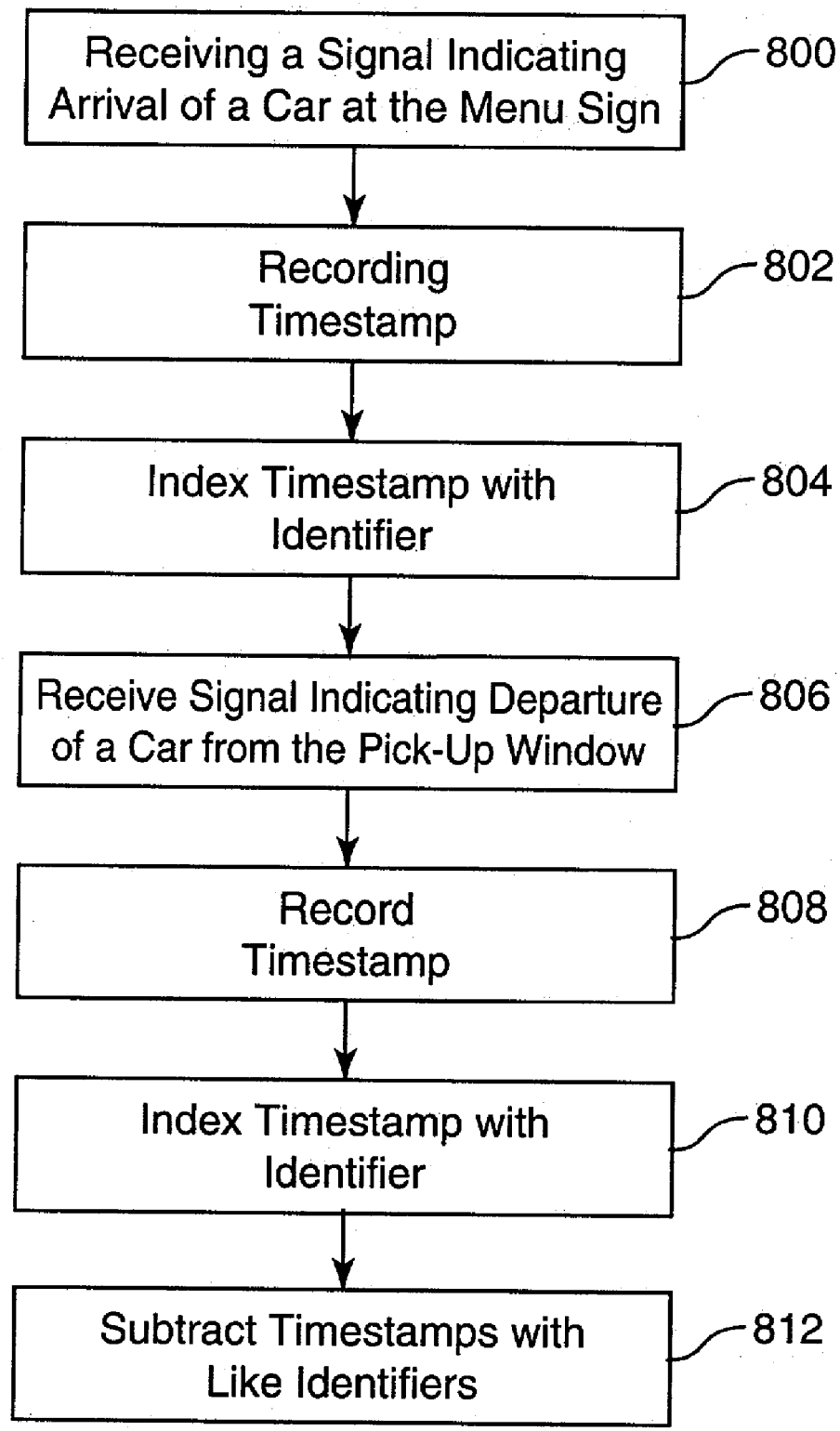
FIG. 8 depicts an embodiment of a method for measuring the length of time transpiring between a car arriving at the drive-through menu sign and delivery of an order to the car.

FIG. 8 depicts an embodiment of a method for measuring the length of time transpiring between a car 110 arriving at the drive-through menu sign 106 and delivery of an order to the car 110. The method of FIG. 8 begins with the repeater 114 receiving a signal from the presence detector 112, indicating the arrival of a car 110 at the drive-up menu sign 106, as is depicted in operation 800. Next, the repeater 114 records the time at which the car 110 arrived at the drive-up menu sign 106, as is depicted in operation 802. In operation 804, the timestamp recorded in operation 802 is associated with a car identifier, so that the timestamp can be associated with a particular car 110. This process has been explained with reference to a similar step occuring in operation 604 of FIG. 6. After placing its order, the car arrives at the pick-up window 108 and pays for and receives its food. Thereafter, when the car 110 departs from the pick-up window 108, the signal from the presence indicator 120 is communicated to the repeater 114, and the repeater 114 receives the signal, as is indicated by operation 806. Next, the repeater 114 records the time at which the car 110 departed from the pick-up window 108, as depicted in operation 808. As was done in operation 804, the timestamp of operation 808 is assocaited with a car identifier in operation 810. Finally, in operation 812, the timestamps of operations 808 and 802 with like car identifiers are subtracted, thereby yielding the length of time transpiring between a car 110 arriving at the drive-through menu sign 106 and delivery of an order to the car 110.

Figure 9:
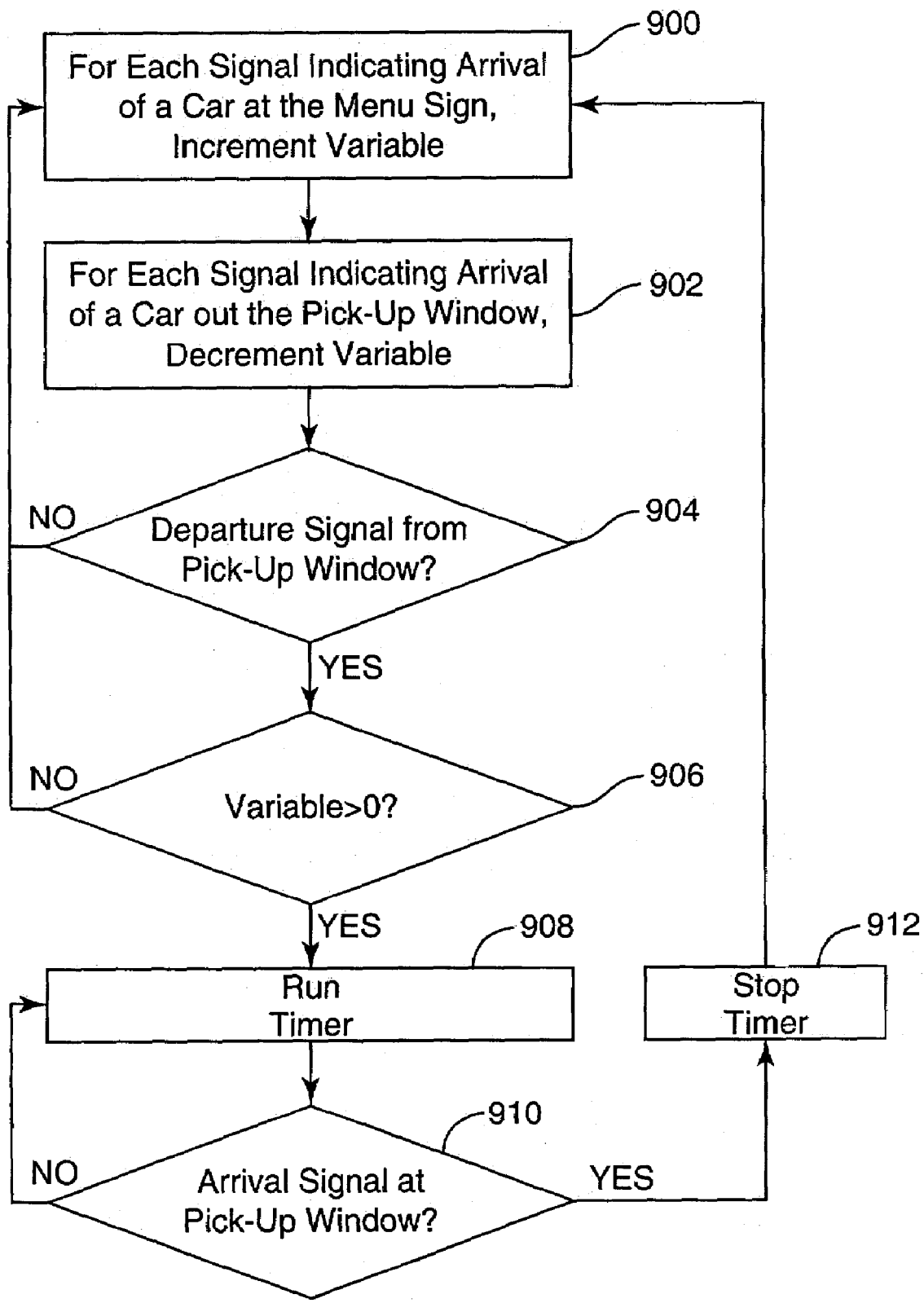
FIG. 9 depicts an embodiment of a method for measuring the cummulative amount of time during which a pick-up window is vacant, while a car occupies some other portion of the drive-through lane.

FIG. 9 depicts an embodiment of a method for measuring the cummulative amount of time during which a pick-up window 108 is vacant, while a car occupies some other portion of the drive-through lane 104. The method of FIG. 9 begins with the repeater 114 awaiting a signal from the presence detector 112 indicating that a car 110 has arrived at the drive-up menu sign 106. In response thereto, the repeater 114 increments a variable, as indicated by operation 900. Meanwhile, the repeater 114 awaits a signal from the second presence detector 120 indicating the arrival of a car 110 at the pick-up window 108. In response thereto, the repeater decrements the variable, as indicated by operation 902. The net effect of operations 900 and 902 is that the variable indicates the number of cars along the drive-through lane 104 that have not yet reached the pick-up window 108. At query operation 904, it is determined whether the second presence detector 120 has sent a signal indicating the departure of a car from the pick-up window 108 (the pick-up window 108 can only be vacant if a car has departed therefrom). If no car has departed therefrom, control returns to operation 900. If, on the other hand, a car has departed therefrom, query operation 906 determines whether the variable is greater than zero (i.e., it determines whether there is a car somewhere along the drive-through lane 104). If not, control returns to operation 900. If there is a car along the drive-through lane, a timing operation begins, as depicted in operation 908. Thereafter, the repeater 114 awaits a signal from the second presence detector 120 indicating that a car 110 has arrived at the pick-up window 108, as shown in operation 910. The timer continues to run until such time as a car 110 arrives at the pick-up window 108. At that point, the timer stops, as depicted by operation 912, and control returns to operation 900.

Figure 10:
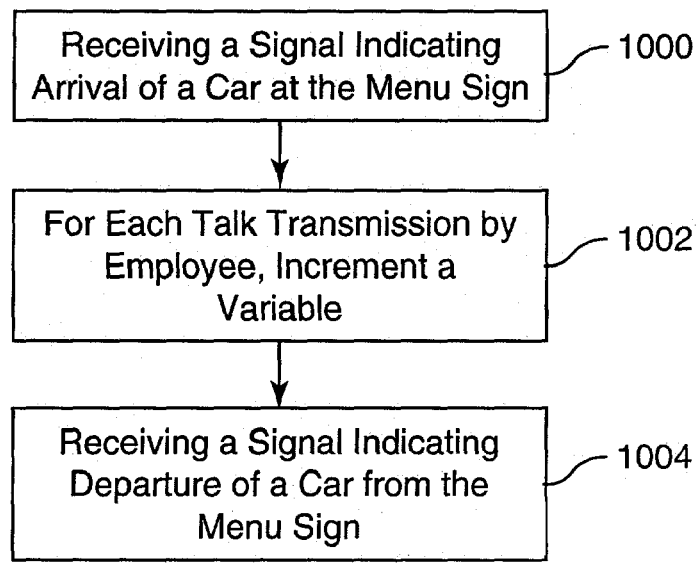
FIG. 10 depicts an embodiment of a method for measuring the number of times an employee of the restaurant speaks with a customer, while the customer is at the drive-through menu sign.

FIG. 10 depicts an embodiment of a method for measuring the number of times an employee 116 of the restaurant 102 speaks with a customer 110, while the customer 110 is at the drive-through menu sign 106. The method of FIG. 10 begins with the repeater 114 receiving a signal from the presence detector 112, indicating the arrival of a car 110 at the drive-up menu sign 106, as is depicted in operation 1000. Next, the repeater 114 awaits a talk operation by the employee 116, and upon each such occurrence the repeater 114 increments a variable, as depicted by operation 1002. This process continues until the repeater 114 receives a signal from the presence detector 112 indicating that the car 110 has departed from the drive-through menu sign 106, as depicted by operation 1004.

Figure 11:
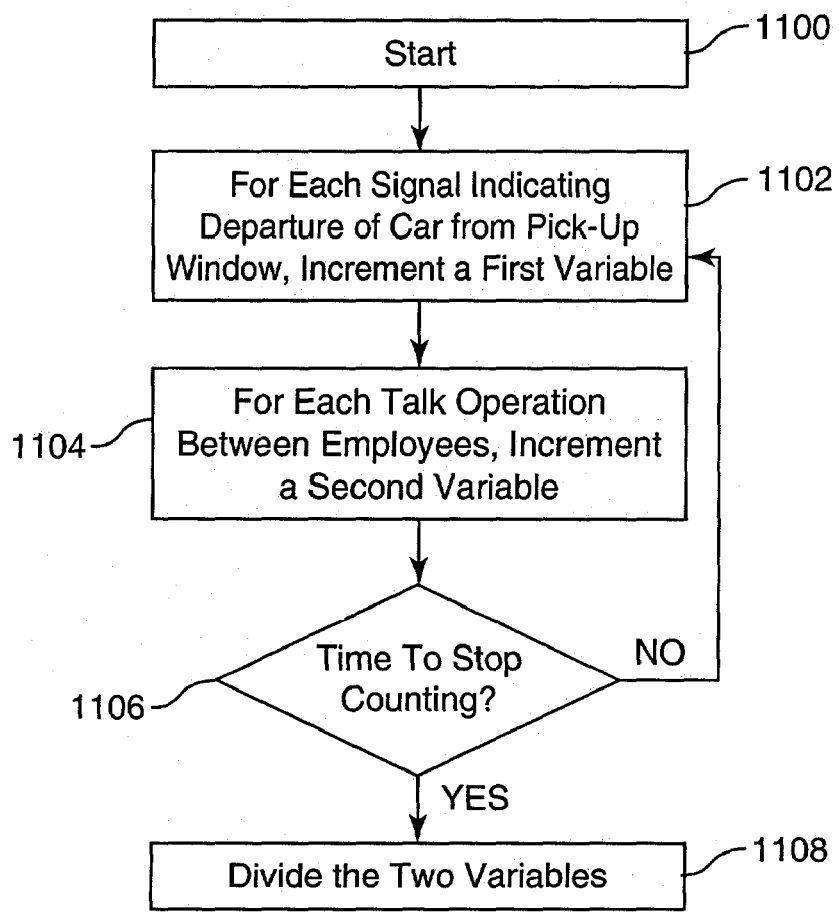
FIG. 11 depicts an embodiment of a method for measuring the average number of times employees speak with each other while servicing a drive-through customer during a given span of time.

FIG. 11 depicts an embodiment of a method for measuring the average number of times employees 116 and 118 speak with each other while servicing a drive-through customer 110 during a span of time. The method of FIG. 11 begins at a point in time at which the counting process is to commence, as is indicated by operation 1100. Thereafter, the repeater 114 awaits a signal from the presence detector 120, indicating that a car 110 has departed from the pick-up window 108. In response thereto, a first count variable (which represents the total number of cars served) is incremented, as is depicted by operation 1102. Next, the repeater 114 awaits the occurrence of a page operation, and in response thereto increments a second count variable, as is depicted by operation 1104. In query operation 1106, it is determined whether the span of time over which the metric is to be gathered has elapsed. If not, control returns to operation 1102, whereupon counting as described above will continue. If so, control is passed to operation 1108, and the second count variable is divided by the first count variable, thereby yielding the average number of times employees 116 and 118 speak with each other while servicing a drive-through customer 110.

The various embodiments described above are provided by way of illustration only and should not be construed to limit the invention. Those skilled in the art will readily recognize various modifications and changes which may be made to the present invention without strictly following the exemplary embodiments and applications illustrated and described herein and without departing from the true spirit and scope of the present invention which is set forth in the following claims.

The claimed invention is:

1. A method of analyzing efficiency of a drive-through lane of a quick-service restaurant, the method comprising:
    collecting efficiency data, wherein efficiency data includes data regarding an efficiency metric with respect to service of an occupant in a car in the drive-through lane of the quick-service restaurant and wherein the efficiency metric includes data measuring the number of talk operations of two-way radios worn by employees in the quick service restaurant;
    transmitting the efficiency data to a computer located remotely from the quick-service restaurant;
    receiving an analysis of the efficiency data from the computer, wherein the analysis includes a comparison of the efficiency data of the quick-service restaurant with efficiency data from other quick-service restaurants.

2. The method of claim 1, wherein the step of collecting data further comprises measuring the amount of time spent by the car at a menu sign along the drive-through lane.

3. The method of claim 1, wherein the step of collecting data further comprises measuring the amount of time between arrival of the car at a menu sign along the drive-through lane and a greeting being delivered to a passenger within the car.

4. The method of claim 1, wherein the step of collecting data further comprises measuring the total number of cars served in a given span of time.

5. The method of claim 1, wherein the step of collecting data further comprises measuring the amount of time between the car leaving a menu sign along the drive-through lane and arriving at a pick-up window along the drive-through lane.

6. The method of claim 1, wherein the step of collecting data further comprises measuring the amount of time spent by the car at a pick-up window along the drive-through lane.

7. The method of claim 1, wherein the step of collecting data further comprises measuring the amount of time between arriving at a menu sign along the drive-through lane and delivery of an order to the car.

8. The method of claim 1, wherein the step of collecting data further comprises measuring the amount of time during which a pick-up window along the drive-through lane is vacant, while a car occupies a position along some other portion of the drive-through lane.

9. The method of claim 1, wherein the received analysis includes a median value for the efficiency metric, wherein data for the efficiency metric collected from a plurality of quick-service restaurants.

10. The method of claim 1, wherein the received analysis includes a mean value for the efficiency metric, wherein for the efficiency metric data collected from a plurality of quick-service restaurants.

11. The method of claim 1, wherein the received analysis includes a percentile value for the quick-service restaurant with respect to the efficiency metric, wherein the percentile value represents the quick-service restaurant's relative ranking among the plurality of quick-service restaurants with respect to the particular efficiency metric.

12. The method of claim 1, wherein the received analysis includes a history of the efficiency metric for the quick-service restaurant, the history extending backwards into time at least one year.

13. A method of analyzing efficiency of a drive-through lane of a quick-service restaurant, the method comprising:
   collecting efficiency data, wherein efficiency data includes data regarding an efficiency metric with respect to service of an occupant in a car in the drive-through lane of a quick-service restaurant, wherein the step of collecting data is measuring the number of times an employee of the restaurant speaks with an occupant of the car in the drive-through lane, while the car is at a menu sign along the drive-through lane;
   transmitting the efficiency data to a computer located remotely from the quick-service restaurant;
   receiving an analysis of the efficiency data from the computer, wherein the analysis includes a comparison of the efficiency data of the quick-service restaurant with efficiency data from other quick-service restaurants.

14. A method of analyzing efficiency of a drive-through lane of a quick-service restaurant, the method comprising:
   collecting efficiency data, wherein efficiency data includes data regarding an efficiency metric with respect to service of an occupant in a car in the drive-through lane of a quick-service restaurant, wherein the step of collecting data is measuring the number of times employees of the restaurant speak with each other via a radio network, between a time the car arrives at a menu sign and a time the car departs from a pick-up window;
   transmitting the efficiency data to a computer located remotely from the quick-service restaurant;
   receiving an analysis of the efficiency data from the computer, wherein the analysis includes a comparison of the efficiency data of the quick-service restaurant with efficiency data from other quick-service restaurants.

* * * * *

UNITED STATES PATENT AND TRADEMARK OFFICE
CERTIFICATE OF CORRECTION

PATENT NO. : 7,177,824 B2
APPLICATION NO. : 10/128661
DATED : February 13, 2007
INVENTOR(S) : Gebran J. Sabongi It is certified that error appears in the above-identified patent and that said Letters Patent is hereby corrected as shown below:

<u>In the Title Pages, on Page 2, Col. 2, under (Other Publications)</u>
Line 1, delete "et. al." and insert -- et al. --, therefor.
Line 9, delete "Speask to Drive-Thu" and insert -- Speaks to Drive-Thru --, therefor.
Line 12, delete "et. al." and insert -- et al. --, therefor.
Line 14, delete "et. al." and insert -- et al. --, therefor.
Line 24, delete "quickservice/$_{13}$ system30.html" and insert -- quickservice/system30.html --, therefor.
Line 34, delete "www.phaseseach.com" and insert -- www.phaseresearch.com --, therefor.

<u>Col. 1</u>
Line 44, delete "exisiting" and insert -- existing --, therefor.
Line 59, delete "a" and insert -- an --, therefor.

<u>Col. 3</u>
Line 4, delete "metalic" and insert -- metallic --, therefor.
Line 22, delete "1 18" and insert -- 118 --, therefor.

<u>Col. 6</u>
Line 9, after "arriving" delete ".".
Line 31, delete "assocaited" and insert -- associated --, therefor.

<u>Col. 7</u>
Line 8, delete "assocaited" and insert -- associated --, therefor.

UNITED STATES PATENT AND TRADEMARK OFFICE
CERTIFICATE OF CORRECTION

PATENT NO. : 7,177,824 B2
APPLICATION NO. : 10/128661
DATED : February 13, 2007
INVENTOR(S) : Gebran J. Sabongi It is certified that error appears in the above-identified patent and that said Letters Patent is hereby corrected as shown below:

<u>Col. 9</u>
Line 8, in Claim 9, before "data" insert -- the median value is calculated based upon --.
Line 11, in Claim 10, before "for" insert -- the mean value is calculated based upon --.

Signed and Sealed this

Thirtieth Day of October, 2007

JON W. DUDAS
*Director of the United States Patent and Trademark Office*